United States Patent
Liu et al.

(10) Patent No.: US 10,872,531 B2
(45) Date of Patent: Dec. 22, 2020

(54) IMAGE PROCESSING FOR VEHICLE COLLISION AVOIDANCE SYSTEM

(71) Applicant: Uber Technologies, Inc., San Francisco, CA (US)

(72) Inventors: Jingchen Liu, San Jose, CA (US); Yuh-Jie Eunice Chen, Mountain View, CA (US); Himaanshu Gupta, Millbrae, CA (US); Upamanyu Madhow, Santa Barbara, CA (US); Mohammed Waleed Kadous, Santa Clara, CA (US)

(73) Assignee: Uber Technologies, Inc., San Francisco, CA (US)

( * ) Notice: Subject to any disclaimer, the term of this patent is extended or adjusted under 35 U.S.C. 154(b) by 169 days.

(21) Appl. No.: 16/147,298

(22) Filed: Sep. 28, 2018

(65) Prior Publication Data

US 2019/0103026 A1    Apr. 4, 2019

Related U.S. Application Data

(60) Provisional application No. 62/566,222, filed on Sep. 29, 2017.

(51) Int. Cl.
| | |
|---|---|
| *G08G 1/16* | (2006.01) |
| *G06K 9/00* | (2006.01) |
| *G06T 7/70* | (2017.01) |
| *G06T 7/20* | (2017.01) |
| *G06K 9/32* | (2006.01) |

(52) U.S. Cl.
CPC ......... *G08G 1/166* (2013.01); *G06K 9/00805* (2013.01); *G06K 9/3233* (2013.01); *G06T 7/20* (2013.01); *G06T 7/70* (2017.01); *G06T 2207/20084* (2013.01); *G06T 2207/30261* (2013.01)

(58) Field of Classification Search
CPC .............. G06K 9/00805; G06K 9/3233; G06T 2207/30261; G06T 7/70; G08G 1/166
See application file for complete search history.

(56) References Cited

U.S. PATENT DOCUMENTS

| | | | |
|---|---|---|---|
| 9,975,483 B1* | 5/2018 | Ramaswamy | B60W 40/08 |
| 2016/0260324 A1* | 9/2016 | Tummala | G08G 1/04 |
| 2017/0322560 A1* | 11/2017 | Zhang | G06K 9/00805 |
| 2018/0141544 A1* | 5/2018 | Xiao | B60W 30/095 |
| 2019/0098953 A1* | 4/2019 | Strickland | G06K 9/00805 |

* cited by examiner

*Primary Examiner* — Ross Varndell

(74) *Attorney, Agent, or Firm* — Fenwick & West LLP

(57) ABSTRACT

A collision warning system determines probabilities of potential collisions between a vehicle and other objects such as other vehicles. In an embodiment, sensors of a client device capture sensor data including motion data and image frames from a forward-facing view of the vehicle. An orientation of the client device relative to the vehicle may be determined using the motion data. The collision warning system determines cropped portions of the image frames and detects an object captured the image frames by processing the cropped portions. The collision warning system determines a probability of a potential collision between the vehicle and the object by tracking motion of the object. Responsive to determining that the probability is greater than a threshold value, the collision warning system may provide a notification of the potential collision to a driver of the vehicle.

14 Claims, 12 Drawing Sheets

IMAGE PROCESSING FOR VEHICLE COLLISION AVOIDANCE SYSTEM

CROSS REFERENCE TO RELATED APPLICATION

This application claims priority under 35 U.S.C. § 119(e) to U.S. Provisional Patent Application No. 62/566,222, filed on Sep. 29, 2017, which is incorporated herein by reference in its entirety for all purposes.

BACKGROUND

Field

This disclosure generally relates to providing warnings of potential collisions between a vehicle and another object such as another vehicle.

Description of the Related Art

Processing large amounts of image data for existing object tracking algorithms may be computationally demanding. Systems may perform object tracking for applications such as collision detection between a vehicle and another object. However, due to compute time or latency constraints, existing methods of collision detection may not be practical for use in various types of vehicles such as personal automobiles. For example, there may be a limited amount of computing resources available onboard a vehicle, in contrast to a server or data center. Thus, existing collision detection methods may not be able to warn a driver of the vehicle of a potential collision in time to prevent the collision.

SUMMARY

A collision warning system determines probabilities of potential collisions between a vehicle and other objects such as other vehicles. In an embodiment, a client device is positioned on a dashboard of the vehicle. The client device includes motion sensors such an inertial measurement unit (IMU) and image sensors to capture image frames of a forward-facing field of view from the vehicle. To process image data efficiently onboard the client device for providing real-time collision warning, the collision warning system selectively crops portions of the captured image frames. In some embodiments, the system determines image parameters such as a vanishing point or horizon of the images based on calibration of the client device using motion data or known parameters of the vehicle. Based on the image parameters, the system detects objects (e.g., another vehicle in the same lane) captured by the image frames and crops the image frames using bounding boxes around the detected objects. The system may track changes in distance between the vehicle and the detected objects. Responsive to determining that the distance is less than a threshold value or that the distance is decreasing too quickly, the system determines that a potential collision is likely. Thus, the system may notify a driver of the vehicle by sending a warning to the client device. By processing cropped images (e.g., instead of full image frames) focused on objects and using the vanishing point, the collision warning system may reduce the computation time required to detect or track objects, which may be advantageous for use cases with client devices having limited computing resources (e.g., mobile devices).

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

I. System Overview

Figure 1:
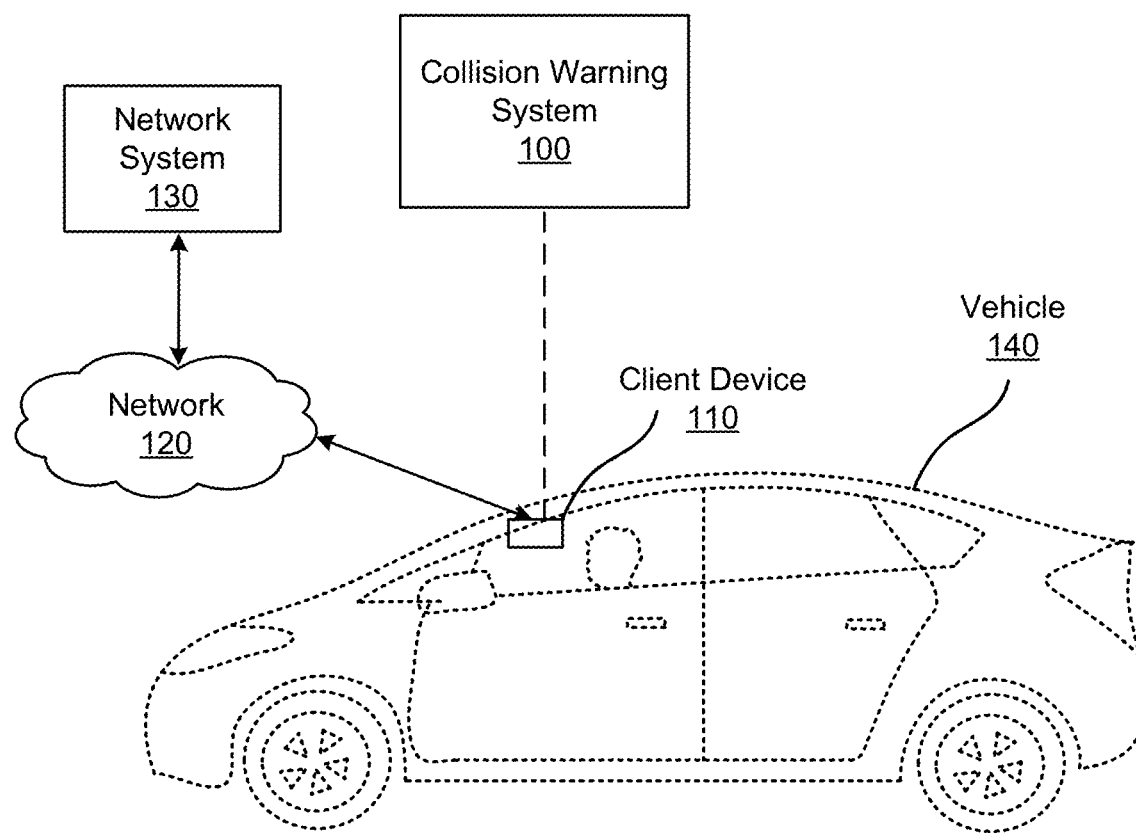
FIG. 1 is a diagram of a system environment for a collision warning system according to one embodiment.

FIG. 1 is a diagram of a system environment for a collision warning system 100 according to one embodiment. The collision warning system 100 notifies users of the network system 130 of potential collision between a vehicle 140 and another object such as another vehicle. The users may include providers that provide service to other users. In an example use case, a provider operates a vehicle 140 to transport a user from a first location (or "pickup location") to a second location (or "destination location"). The network system 130 may determine pickup locations and coordinate providers to pick up users at the pickup locations. Other types of services provided via the network system 130 include, for example, delivery of goods such as mail, packages, or consumable items. The collision warning system 100 may collect or process sensor data from a client device 110, as well as provide notifications during services (e.g., trips) provided via the network system 130.

The system environment includes the network system 130 and one or more client devices 110 of users of the network system 130. The collision warning system 100 executes on one or more client devices 110. Different instances of the collision warning system 100 may execute on multiple client devices 110. The network system 130 and client devices 110 may be connected to each other via a network 120. In other embodiments, different or additional entities can be included in the system environment. The functions performed by the various entities of FIG. 1 may vary in different embodiments.

A user can interact with the network system 130 through the client device 110, e.g., to request service or to receive requests to provide service. A client device 110 can be a personal or mobile computing device, such as a smartphone, a tablet, or a notebook computer. In some embodiments, the client device 110 executes a client application that uses an application programming interface (API) to communicate with the network system 130 through the network 120. The client application of the client device 110 can present information received from the network system 130 on a user interface, such as a geographic map (e.g., within a building or outdoors), current location of the client device 110, or other notifications. In some embodiments, the client application running on the client device 110 can determine the current location using one or more sensors of the client device 110, such as a global positioning system (GPS) receiver, and provide the current location to the network system 130.

The client device 110 may include various sensors including one or more image sensors and motion sensors. Image sensors may include one or more types of cameras, e.g., optical, infrared, laser, radar, etc. Additionally, the image sensors may capture image data, for instance, one or more image frames at a certain resolution and/or frame rate. The image data may include multiple image frames that are part of a video. Motion sensors include, e.g., accelerometers, gyroscopes, magnetic sensors, inertial measurement units (IMUs), GPS, and the like. The motion sensors can capture motion data such as an IMU stream, acceleration, velocity, or bearing of the client device 110, e.g., and by extension, the vehicle 140 to which the client device 110 is positioned or attached. The collision warning system 100 may use sensor data (e.g., image data and/or motion data) captured by the client device 110 to perform collision detection.

In some embodiments, a provider uses a client device 110 to interact with the network system 130 and receive invitations to provide service for users. For example, the provider is a person operating a vehicle 140 capable of transporting users. In some embodiments, the provider is an autonomous vehicle 140 that receives routing instructions from the network system 130 (or from a local navigation system). For convenience, this disclosure generally uses a car as the vehicle 140, which is operated by a driver as an example provider. However, the embodiments described herein may be adapted for a provider operating alternative vehicles (e.g., boat, airplane, helicopter, VTOL, etc.) or vehicles that do not necessarily need to be operated by a person.

In some embodiments, a provider uses a first client device 110 to interact with the network system 130, and the provider has a second client device 110 that includes the various sensors for collecting sensor data used by the collision warning system 100. In other embodiments, the provider has one client device 110 for both types of functionality. A client device 110 for collecting the sensor data may be mounted in a forward-facing position and orientation in the vehicle 140, for example, on a dashboard or rear-view mirror.

In some embodiments, a provider can receive invitations or assignment requests through a client device 110. An assignment request identifies a user who submitted a trip request to the network system 130 and determines the pickup location or the destination location of the user for a trip. For example, the network system 100 can receive a trip request from a client device 110 of a user, select a service provider from a pool of available (or "open") providers to provide the trip, e.g., based on the vehicle type, determined pickup location, a signature of short-range transmission, or the destination location. The network system 130 transmits an assignment request to the selected provider's client device 110.

Client devices 110 can communicate with the network system 130 via the network 120, which may comprise any combination of local area and wide area networks employing wired or wireless communication links. In one embodiment, the network 120 uses standard communications technologies and Internet protocols. For example, the network 120 includes communication links using technologies such as the Internet, 3G, 4G, BLUETOOTH®, or WIFI. In some embodiments, all or some of the communication links of the network 120 may be encrypted.

The network system 130 may include a map database stores map information of geographic regions in which the network system 130 offers services such as transportation for users. In some embodiments, the collision warning system 100 may also include a local map database, e.g., such that the client device 110 does not necessarily need to communicate with the network system 130 to receive map information. The map information may include map properties of a geographical region such as road properties that describe characteristics of the road segments, such as speed limits, road directionality (e.g., one-way or two-way), traffic history, traffic conditions, addresses on the road segment, length of the road segment, and type of the road segment (e.g., surface street, residential, highway, toll). The network system 130 or collision warning system 100 may use the map database to determine collision warnings, navigation information, pickup locations, or destination locations for users.

II. Example Image Processing

Figure 2A:
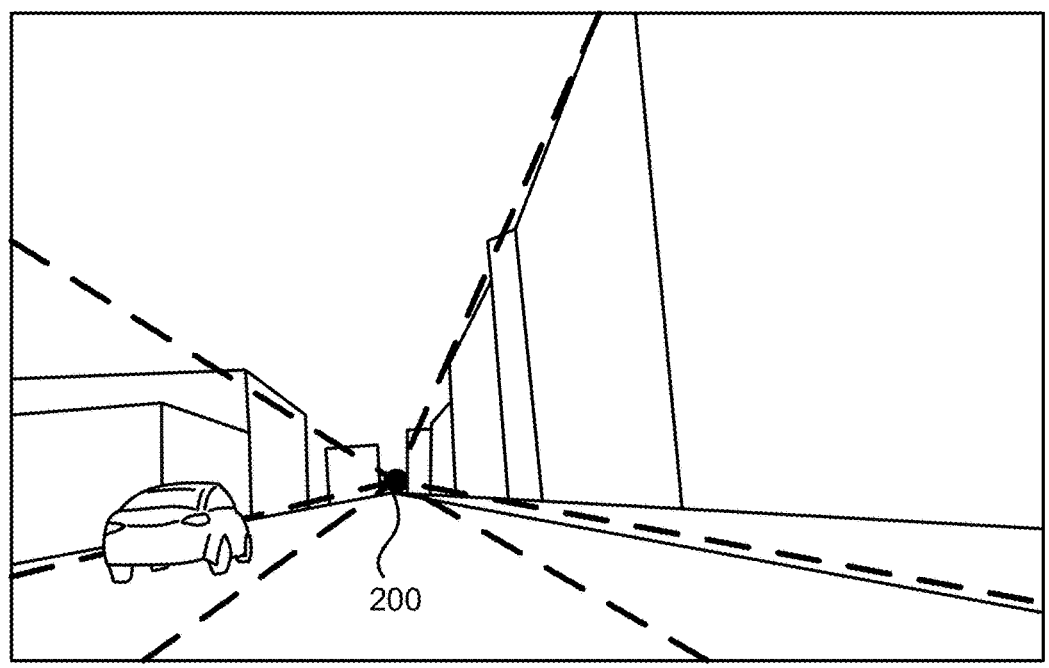
FIGS. 2A and 2B are diagrams illustrating cropping a portion of an image based on a vanishing point according to various embodiments.
Figure 2B:
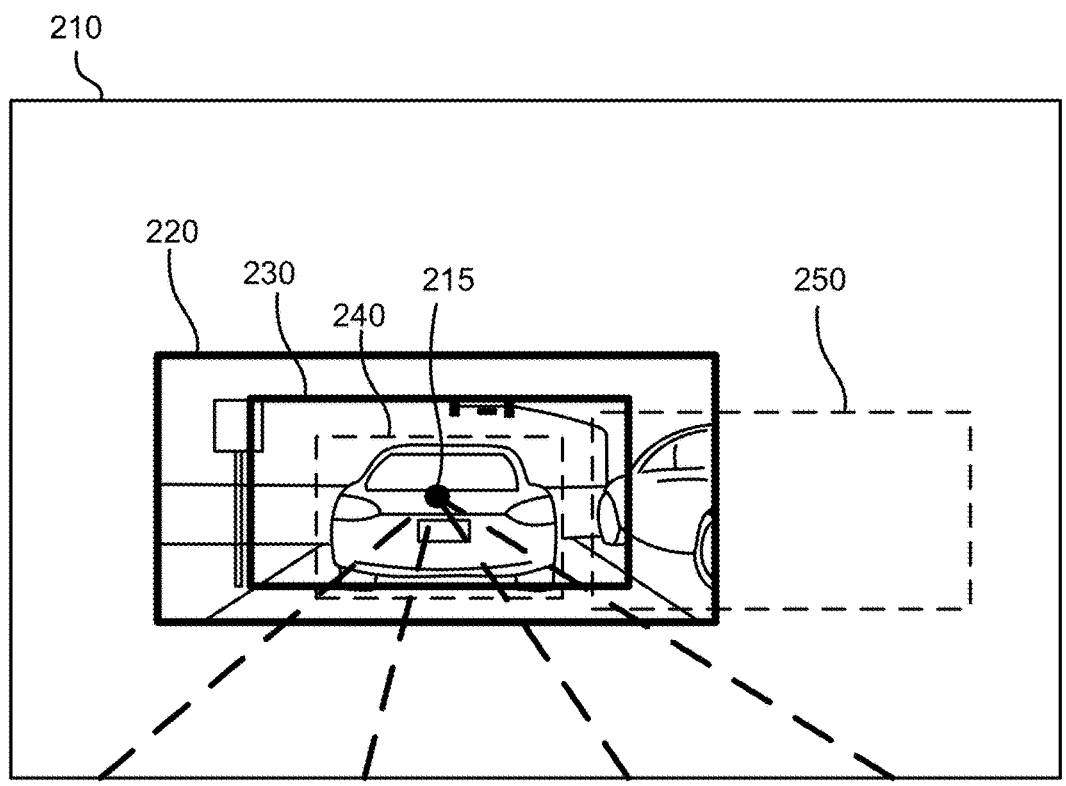

FIGS. 2A and 2B are diagrams illustrating cropping a portion of an image based on a vanishing point according to various embodiments. FIG. 2A is a diagram of an image frame captured from a forward-facing field of view of a vehicle 140. In some embodiments, the collision warning system 100 may determine a vanishing point 200 of the image frame based on an intersection of the dashed lines shown in FIG. 2A. Two or more of the dashed lines may represent virtual parallel lines in 3D in real life, where the lines are projected (e.g., as captured by image sensors) onto a 2D image frame. For example, the dashed lines represent lane markers on the ground of a road. Additionally, the dashed lines may represent a virtual line approximating other features captured in the image frame such the height of buildings surrounding a road. The collision warning system 100 may detect the lane markers or other objects such as buildings for vanishing point determination using image processing or object detection algorithms known to one skilled in the art.

FIG. 2B is a diagram of a cropped image frame 210 captured from a forward-facing field of view of a vehicle 140. In contrast to the full image frame shown in FIG. 2A, the image frame 210 shown in FIG. 2B includes cropped portions of the corresponding full image frame. The embodiment of FIG. 2B shows cropped portions using a first scale 220 and a second scale 230. The scales may vary in size, dimensions, or other attributes. The collision warning system 100 may crop a portion of the image frame 210 to focus on a detected object in front of the vehicle 140, such as another vehicle in the same lane on the road.

As shown in FIG. 2B, the bounding box 240 indicates a portion of the image frame 210 including a detected vehicle in the same lane. In addition, the bounding box 250 indicates another portion of the image frame 210 including another detected vehicle in an adjacent lane. Bounding boxes may vary in size or dimension based on the corresponding vehicle or another type of detected object or the location of the object relative to the vehicle 140. For instance, a bounding box increases or decreases in size as the "bounded" detected object moves closer toward or further away from the vehicle 140, respectively.

The collision warning system 100 may prioritize detection and tracking of objects in the same lane as the vehicle 140 because such objects present a greater risk of collision than other objects in a different lane. Thus, the collision warning system 100 may use the second scale 230 to crop the image frame 210, which improves efficiency of tracking the detected vehicle in the bounding box 240 because there are a reduced number of pixels in the cropped version of the image frame 210. The collision warning system 100 may switch between two or more different scales while scanning for potential objects within cropped versions of the image frame 210. Further, the collision warning system 100 may center a scale for cropping about the vanishing point 215 of the image frame 210. In some embodiments, the collision warning system 100 selectively tracks one or more objects with corresponding bounding boxes that overlap with the vanishing point of the image frame, which indicates that the tracked objects are likely in the same lane as the vehicle.

Figure 3A:
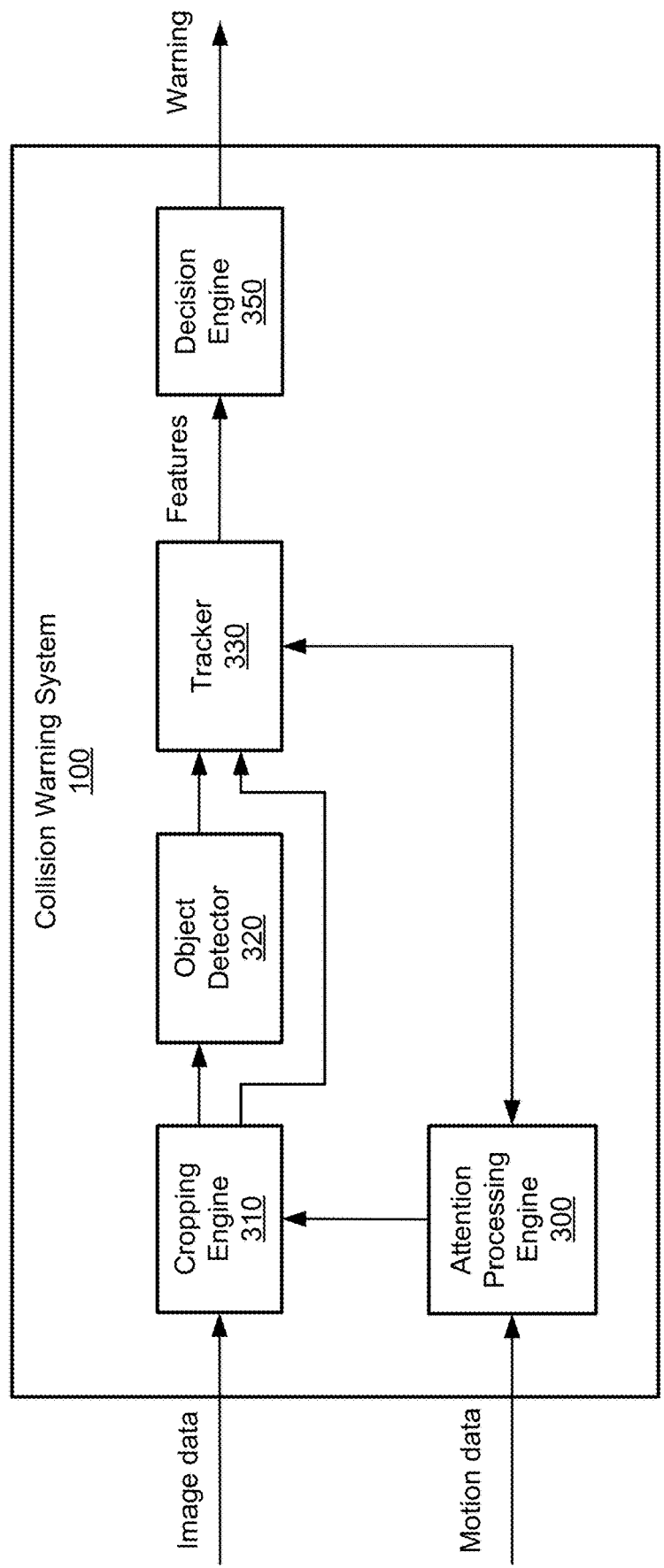
FIG. 3A is a block diagram of the collision warning system according to one embodiment.

FIG. 3A is a block diagram of the collision warning system 100 according to one embodiment. In the example shown in FIG. 3A, the collision warning system 100 may include an attention-processing engine 300, cropping engine 310, object detector 320, tracker 330, and decision engine 350. In some embodiments, one or more processors of the collision warning system 100 executes multiple threads (e.g., simultaneously) to improve efficiency of collision detection processing. For example, a master thread executes operations of the cropping engine 310 and tracker 330, while one or more background threads execute operations of the attention-processing engine 300 and object detector 320. The components of the collision warning system 100 shown in FIG. 3A are described below with reference to FIGS. 3B, 4A-B, 5, 6A-C, and 7.

The attention-processing engine 300 determines client device parameters, which may include intrinsic and extrinsic parameters, based on input motion data captured by motion sensors (e.g., an IMU) of a client device 110. Intrinsic parameters may indicate a focal length or aspect ratio of an image sensor of a client device 110. Extrinsic parameters may indicate a pan or tilt angle of the client device 110 (e.g., relative to a vehicle 140), or a distance between a mounted location of the client device 110 and a front (or rear) end of a vehicle 140 (e.g., based on dimensions of the vehicle 140 according to make and model). The attention-processing engine 300 may provide the client device parameters or other relevant information to other components of the collision warning system 100 such as the cropping engine 310 and the tracker 330.

In an embodiment, the attention-processing engine 300 uses IMU motion data to estimate the tilt angle of the client device 110. Furthermore, the attention-processing engine 300 may use tracked trajectory of detected objects to estimate the pan angle of the client device 110. The attention-processing engine 300 may use the tilt and pan angles along with focal length of a camera of the client device 110 to determine a vanishing point of an image. In some embodiments, the attention-processing engine 300 may determine a stable estimate of the vanishing point within several seconds from initializing processing of an image stream. Additionally, the attention-processing engine 300 may use the client device parameters to back-project positions and orientations of 2D objects captured in image frame into 3D space.

In some embodiments, the attention-processing engine 300 uses a smart scale-selection algorithm to search for potential objects in image frames. As an example use case, the attention-processing engine 300 switches between a first scale of 128×256 pixels and a second scale of 256×512 pixels. In other embodiments, the attention-processing engine 300 may use any other number of scales or scales having different pixel dimensions. The attention-processing engine 300 may store a current state, for instance, indicating whether or not a detected object is currently in front of a vehicle 140. Responsive to determining that the state indicates that no detected object is currently in front of the vehicle 140, the attention-processing engine 300 may linearly scan through scales to search for objects in image frames. Responsive to determining that the state indicates that a detected object is currently in front of the vehicle 140, the attention-processing engine 300 may select a scale for tracking the detected object in image frames. For instance, the attention-processing engine 300 selects the first scale of 128×256 pixels to track a relatively smaller object and selects the second scale of 256×512 pixels to track a relatively larger object.

Figure 4A:
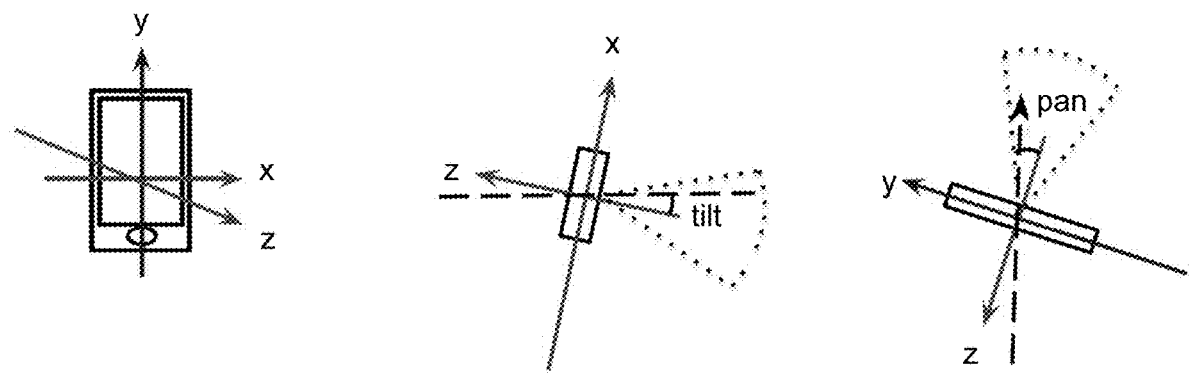
FIGS. 4A and 4B show diagrams illustrating calibration of a client device of the collision warning system according to various embodiments.
Figure 4B:
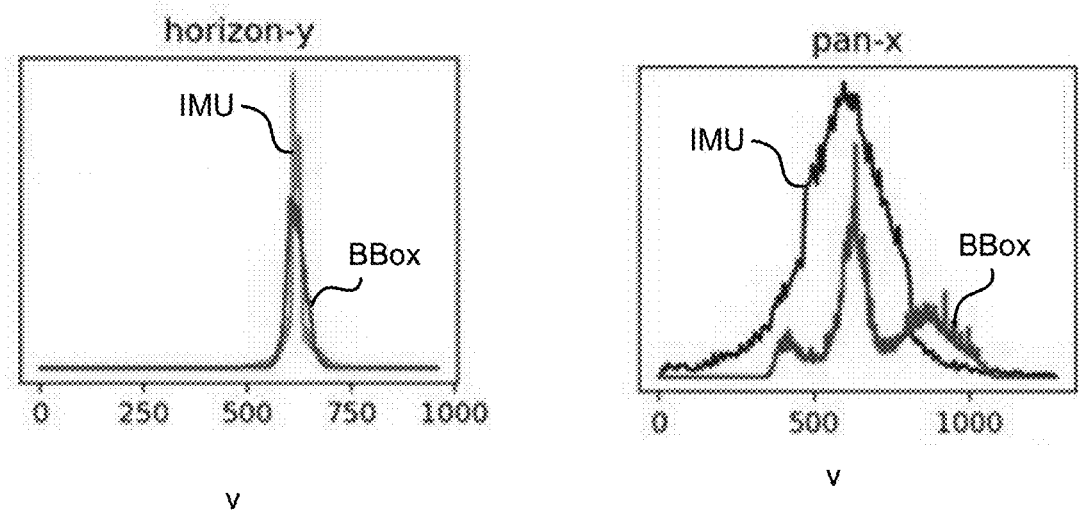

Referring now to FIGS. 4A and 4B, these figures show diagrams illustrating calibration of a client device 110 of the collision warning system 100 according to various embodiments. As shown in FIG. 4A, the attention-processing engine 300 may determine a tilt angle or a pan angle of the client device 110 relative to a 3D x-y-z coordinate system of the client device 110. FIG. 4B illustrates example histograms for a pan angle and a horizon of image frames captured by the client device 110, which are determined based on IMU data or bounding box ("BBox") image data.

In an embodiment for IMU-based tilt angle estimation, the attention-processing engine 300 updates a histogram of tilt angles based on captured acceleration motion data, e.g., acceleration vectors. The attention-processing engine 300 may weigh (e.g., using a majority vote algorithm) the acceleration vectors based on a state of the vehicle 140. For example, the attention-processing engine 300 weighs acceleration vectors captured when the vehicle 140 is stationary more heavily than acceleration vectors captured when the vehicle 140 is not accelerating (i.e., zero speed change). Further, the attention-processing engine 300 weighs acceleration vectors captured when the vehicle 140 is not accelerating more heavily than acceleration vectors captured when the vehicle 140 is accelerating (i.e., non-zero speed change).

In an embodiment for IMU-based pan angle estimation, the attention-processing engine 300 updates a histogram of pan angle votes for a voting algorithm based on captured acceleration vectors. The attention-processing engine 300 may determine the pan angle relative to the norm of a vertical-heading plane of the client device 110 or vehicle 140. Acceleration vectors except for those captured when the vehicle 140 is turning may fall on the vertical-heading plane. The attention-processing engine 300 may use a pair of acceleration vectors to generate a pan angle vote. In an embodiment during real-time estimation, the attention-processing engine 300 maintains a cache of a certain number of historical acceleration vectors. The attention-processing engine 300 may determine whether to replace cached vectors with new acceleration vectors by performing a cross-product check.

Figure 5:
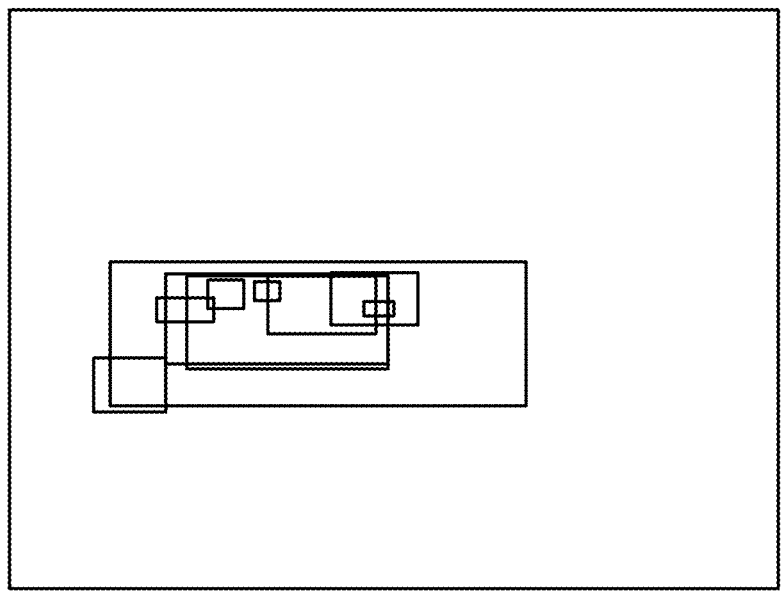
FIG. 5 illustrates a process of determining a vanishing point and horizon in an image according to an embodiment.

Referring now to FIG. 5, this figure illustrates a process of determining a vanishing point and horizon in an image according to an embodiment. In one embodiment, the attention-processing engine 300 determines the vanishing point and horizon of an image frame based on a Gaussian distribution of cropped portions of image frames. As shown in FIG. 5, the bounding boxes correspond to cropped portions of the image frame 500 to track detected objects (e.g., vehicles or other obstacles) in front of a provider's vehicle 140. In particular, the bounding box 505 tracks motion of another vehicle in the same lane, and the bounding box 510 tracks motion of a vehicle in an adjacent lane. The bounding boxes 505 and 510 may vary in size based on distance or relative position between the vehicle 140 and the corresponding tracked object. The attention-processing engine 300 may determine the vanishing point 515 as the average position of the aggregate bounding boxes. Additionally, the attention-processing engine 300 determines the horizon 520 to be a horizontal line that aligns to an upper edge of the aggregate bounding boxes.

The cropping engine 310 determines cropped portions of image frames. The cropping engine 310 may perform cropping using image parameters such as vanishing points and horizons of image frames captured by image sensors of a client device 110, among other types of input information. The cropping engine 310 may receive image data (e.g., an image stream) from the image sensors and client device parameters output by the attention-processing engine 300. Accounting for the pan and tilt angle of the client device 110 may allow the cropping engine 310 to determine more accurate cropped portions including detected objects or potential objects captured in image frames, e.g., because there are variations in how client devices 110 are set up across different providers and vehicles 140. For instance, one provider mounts a client device 110 at a lower (or higher) position or a more steep (or shallow) angle than does another provider in their respective vehicles 140. Thus, the cropping engine 310 may normalize variations due to human-caused artifacts or errors (e.g., a loose or sloppy mounting) or vehicle structure (e.g., truck or SUV vs. compact car), among other sources of variation. For example, due to vibrations from the vehicle 140, the client device 110 shifts (e.g., from an initial setup) while the provider is operating the vehicle 140, e.g., while transporting another user.

The object detector 320 detects objects in cropped portions of image frames of input image data determined by the cropping engine 310. Additionally, the object detector 320 may perform object detection using image parameters received from the cropping engine 310 including image type or resolution, camera or video frame rate, scale used for cropping, etc. The input image data may include image frames of a video clip having a predetermined duration (e.g., 30-60 seconds). The object detector 320 may use one or more types of object detection models or techniques known to one skilled in the art including, but not limited to, single shot detection (SSD), normalized cross-correlation (NCC), machine learning or deep learning architectures (e.g., neural networks, convolutions, Bayesian inference, linear classification, loss functions, optimizations, generative models, principle component analysis, Tensorflow, etc.), radius search, particle filter, hybrid sampling, optical flow, or non-maximum suppression post-processing. In an embodiment based on SSD, the object detector 320 can detect an object within 400 milliseconds of compute time, which is an improvement from existing object detection methods that require over one second of compute time to detect an object.

As previously shown in the example of FIG. 2B, the bounding boxes 240 and 250 indicate objects detected by the object detector 320 from captured image frames. The object detector 320 may crop or enlarge portions of the image frames for training data. Thus, the training data may include images of objects at various size scales, and may focus on certain features of interest such as cars, buildings, pedestrians, bicyclists, obstacles on the road, or other types of structures. The object detector 320 may separately detect large objects (e.g., having greater than a threshold dimension) and small objects (e.g., having less than a threshold dimension). The training data may include videos (e.g., a continuous series of image frames) in addition to static image frames.

The tracker 330 tracks objects in image frames detected by the object detector 320. The tracker 330 may receive image parameters from the cropping engine 310 as input to perform tracking. The tracker 330 determines trajectory information (also referred to as features or object data), which may include a distance between a vehicle 140 and another object, or a rate of change of the distance (e.g., indicating that the vehicle 140 is quickly approaching the other object). To reduce the compute resources for object tracking, the tracker 330 processes cropped images of image frames determined by the cropping engine 310. Since cropped images include a lower amount of data (e.g., less pixels) to process, the required compute time decreases. In some embodiments, the tracker 330 uses optical flow to find pixel correspondence of cropped portions of image frames from the cropping engine 310. For instance, the tracker 330 detects an amount of pixel shift in a certain one or more directions (e.g., up, down, left, right) between image frames to determine motion or trajectory of detected objects.

Figure 6A:
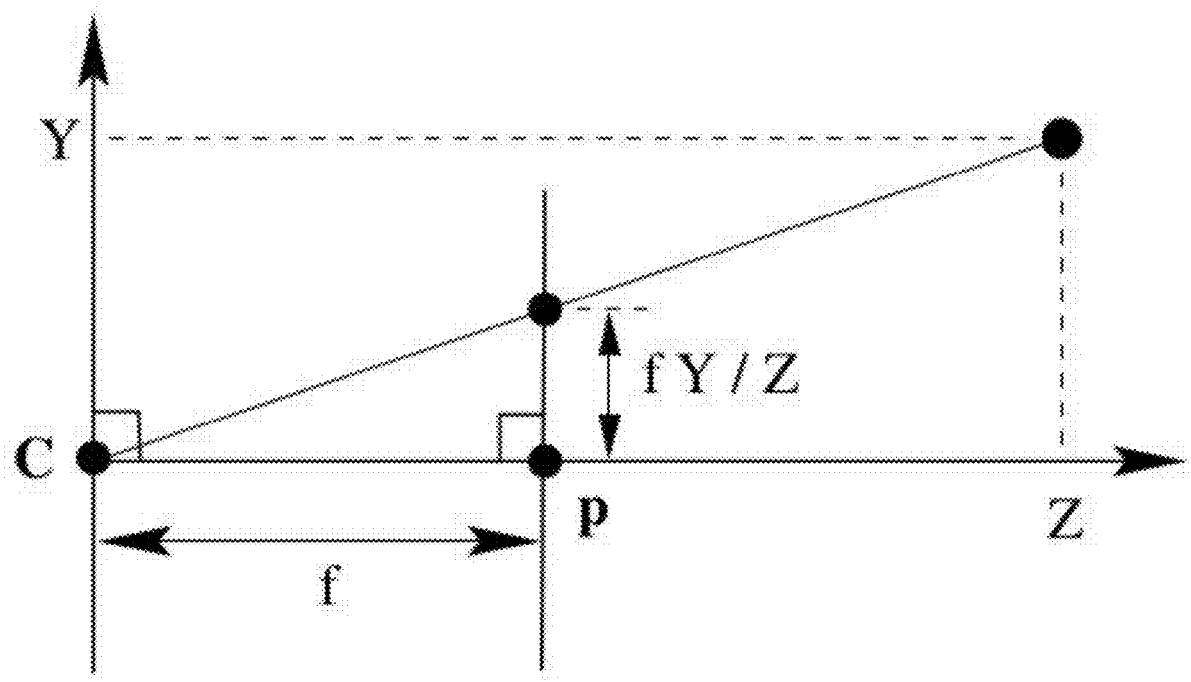
FIG. 6A is a diagram for depth estimation according to an embodiment.

Referring now to FIG. 6A, this figure is a diagram for depth estimation according to an embodiment. In some embodiments, the tracker 330 uses a pinhole camera model to estimate the depth "Z" (distance) from a vehicle at point C to another object. In FIG. 6A, "f" represents the focal length of an image sensor of a client device 110 with the vehicle 140. The other object may be another vehicle having a width "Y" (e.g., approximately 1.8 meters). In some embodiments, the tracker 330 may use a lookup table to determine the expected width "Y," height, or aspect ratio of a vehicle based on a type of the vehicle. A default aspect ratio used to approximate dimensions of vehicles may be 2:1. Based on trigonometry, the tracker 330 may output a bounding box at point "p" having a width y=f*Y/Z. Thus, the tracker 330 determines the depth to be Z=f*Y/y. Moreover, the tracker 330 may determine relative velocity and acceleration of the detected object based on taking the derivative(s) of "Z" with respect to time.

Figure 6B:
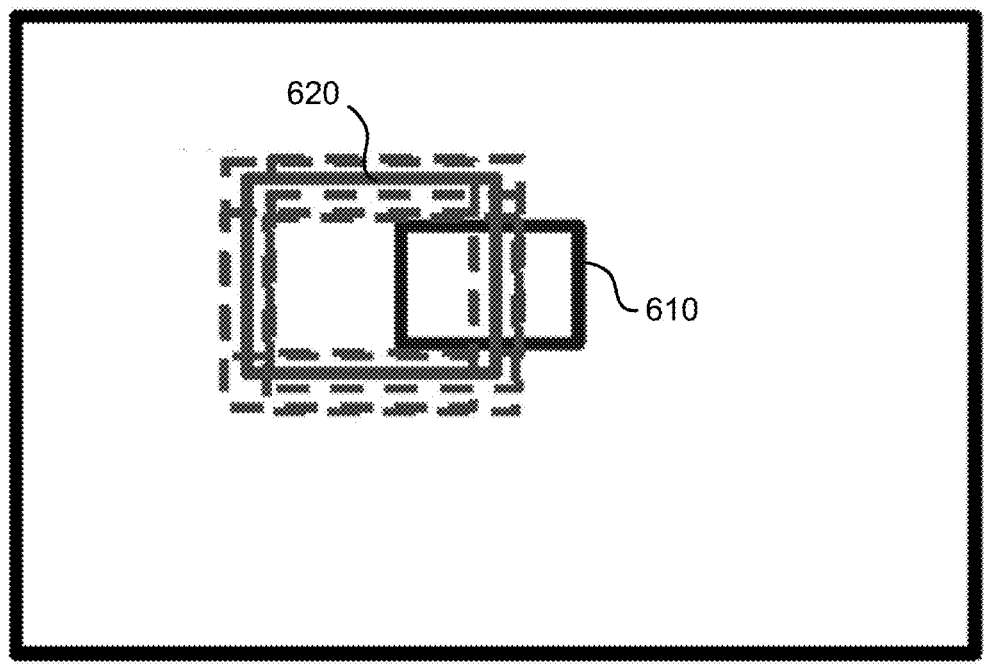
FIGS. 6B and 6C show diagrams illustrating bounding boxes for tracking objects according to various embodiments.
Figure 6C:
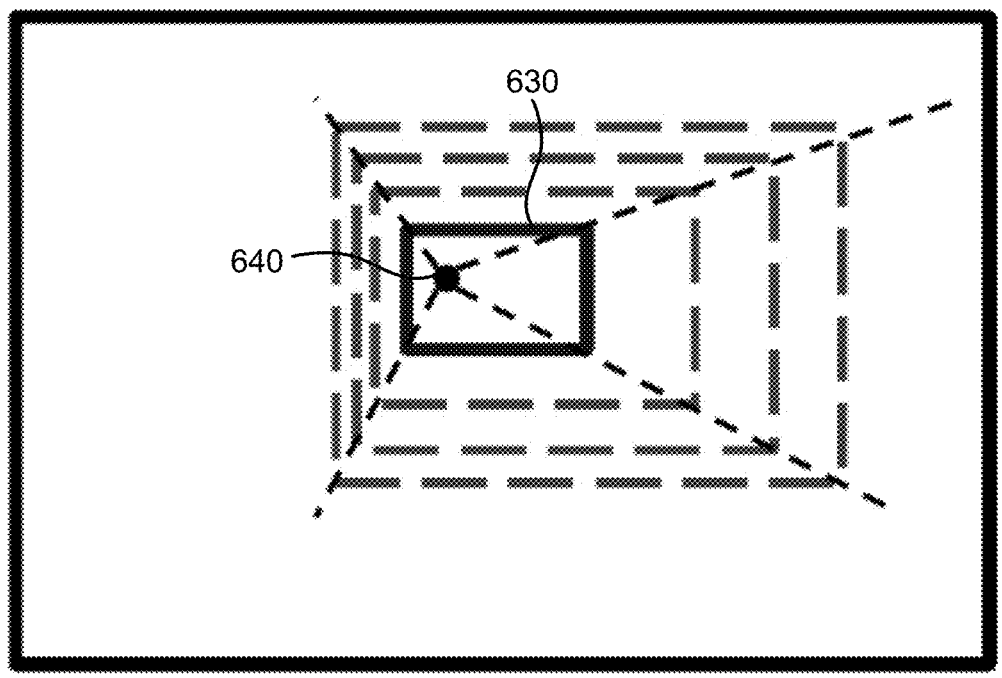

FIGS. 6B-C show diagrams illustrating bounding boxes for tracking objects according to various embodiments. To track a detected object, the tracker 330 may predict motion of the detected object. For example, as shown in FIG. 6B, given an old position 610 of the detected object, the tracker 330 uses optical flow (or another suitable algorithm) to determine a candidate position for a new position 620. The tracker 330 performs a local search around an initial predicted position using a bounding box (e.g., a rectangular search window) having fixed dimensions to find the new position 620. As shown in FIG. 6C, the tracker 330 may also perform a search around candidate positions by scaling the bounding box 630 to one or more different dimensions (e.g., expanding, shrinking, or skewing). The tracker 330 may scale the bounding box 630 based on a vanishing point 640 or projected lines intersecting the vanishing point 640 in the 2D image frame. The tracker 330 may predict how the bounding box 630 may change as the detected object moves closer toward a provider's vehicle 140, e.g., based on changes in a vertical direction of the image frames. For instance, a first bounding box tracking a first vehicle in a different lane on the road will have greater change in the vertical direction than a second bounding box tracking a second vehicle in a same lane as the provider's vehicle 140.

In embodiments using synchronous detection and tracking, the object detector 320 and tracker 330 both process image data at a same frame rate (e.g., 30 frames per second). In contrast, in a different embodiment using asynchronous detection and tracking, the object detector 320 may perform down sampling (e.g., decrease from 30 to three frames per second) to speed up object detection processing in conjunction with the tracker 330.

In an embodiment using synchronous detection and tracking, the tracker 330 determines matches (e.g., data association) between one or more detected objects and one or more trajectories at a given frame. The tracker 330 determines matches based on an affinity score, which accounts for similarity in appearance (e.g., relative position or dimensions in image frames) between a detected object and trajectory, as well as motion consistency between the detected object and trajectory. The tracker 330 may determine motion consistency based on a measure of intersection over a union of the detected object and trajectory in a constant position-based motion model and a constant velocity-based motion model. The tracker 330 selects the motion model corresponding to the greater measure of intersection, i.e., closer match. Using this process, the tracker 330 may match one or more features across multiple frames, where the features follow a given predicted trajectory. Example features may include objects such as vehicles, people, or structures, as well as low-level features such as a corner or window of a building, or a portion of a vehicle. In some embodiments, the tracker 330 uses a Bayesian model to update a probability density function for predicting motion or position of an object along a trajectory. The tracker 330 may recursively update a current state of the Bayesian model using new camera data or sensor measurements. The tracker 330 may also determine predictions by implementing algorithms known to one skilled in the art including, e.g., Global Nearest Neighbor (GNN), the Hungarian Algorithm, and K-best assignment. The tracker 330 may calculate the affinity score by summing sub-scores for the similarity in appearance and motion consistency, which may be a weighted average.

Responsive to determining a match between a detected object and trajectory, the tracker 330 updates the existing trajectory to reflect the latest detected position or motion of the object. Responsive to determining that a detected object does not match any of the one or more trajectories, the tracker 330 generates a new trajectory for the detected object. Responsive to determining that a trajectory does not match any of the one or more detected objects, the tracker 330 may remove the trajectory, or update the trajectory to match another detected object.

In some embodiments, a filter may smooth estimations output by the tracker 330. The filter includes one or more types of filters such as a Kalman filter, e.g., having a canonical closed form. The filter may include state parameters associated with a relative distance, velocity, and acceleration at a given time. The filter may tune the parameters for a state transition equation to reduce or eliminate measurement noise, random noise, or noise contributed by other sources. In some embodiments, the filter uses a white noise jerk model, which assumes that the derivative of acceleration of objects is a white noise process.

The decision engine 350 determines probabilities (e.g., likelihoods) of potential collisions based on trajectory information or other features output by the tracker 330 and optionally processed by a filter. In some embodiments, the decision engine 350 may also receive client device parameters from the attention-processing engine 300 as input. The decision engine 350 uses a physics model to estimate position or motion of a vehicle 140 (e.g., "follow vehicle") and another object in front of the vehicle 140 (e.g., "lead vehicle"). The decision engine 350 may predict an amount of time (or distance) required for the follow vehicle to decelerate in time to avoid colliding with the lead vehicle, based on one or more scenarios of the lead vehicle. For instance, the lead vehicle may gradually decelerate (e.g., approaching a road intersection or exiting a highway) or rapidly decelerate (e.g., in response to an unexpected event such as an obstacle appearing on the road). Predictions may be based on various factors including, but not limited to, vehicle type, vehicle speed, road conditions, weather conditions, time of day, traffic conditions, or other map information stored in a map database. Responsive to determining that the amount of time or distance required for the follow vehicle to decelerate is within a threshold (e.g., available amount of time or distance), the decision engine 350 determines that there is a low likelihood of a collision. Responsive to determining that the amount of time or distance exceeds the threshold, the decision engine 350 determines that there is a high likelihood of a collision.

Figure 3B:
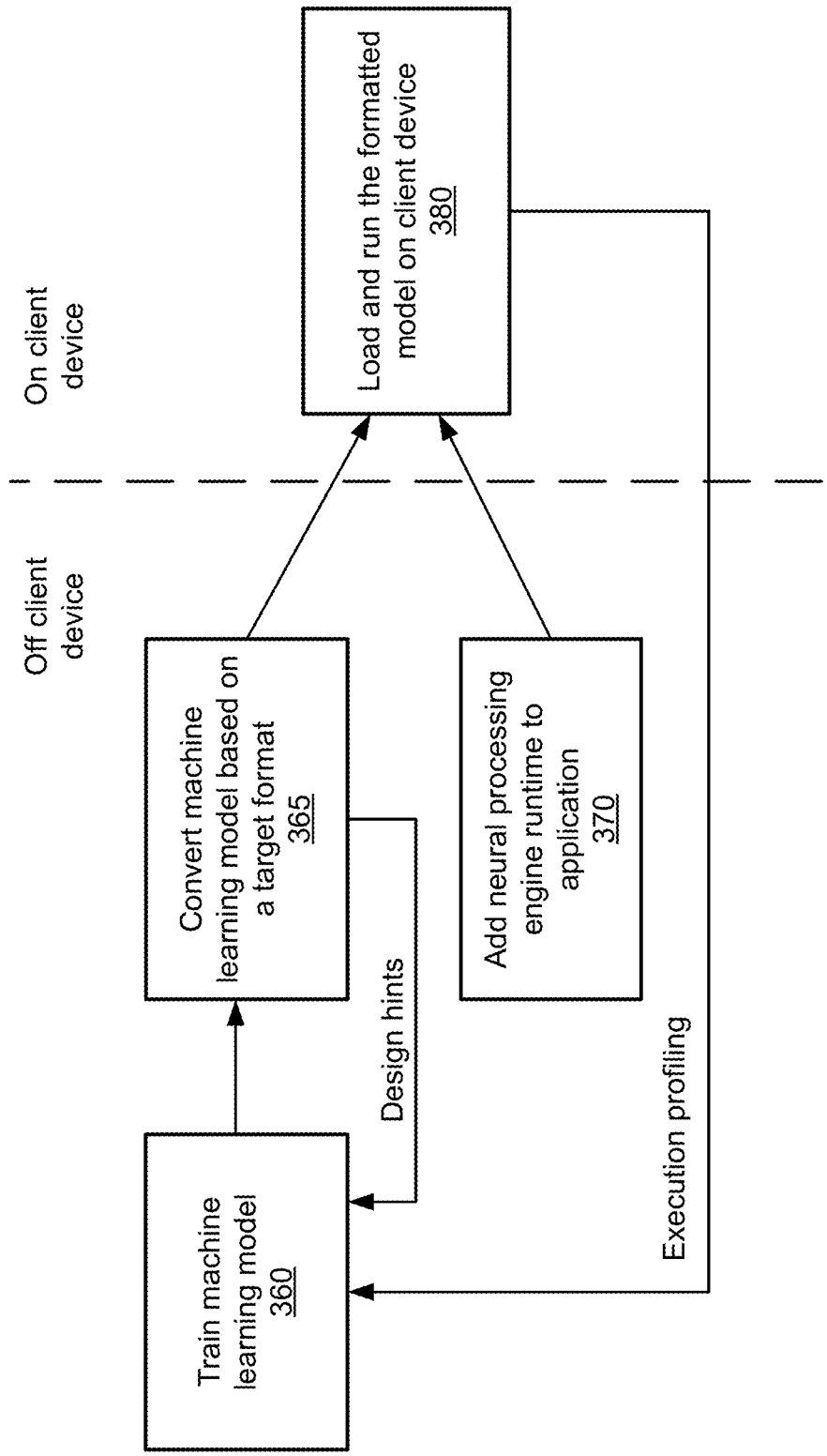
FIG. 3B illustrates a process for running the collision warning system off and on a client device according to one embodiment.

Referring back now to FIG. 3B, this figure illustrates a process for running the collision warning system 100 off and on a client device 110 according to one embodiment. The collision warning system 100 may perform functionality both off the client device 110 (e.g., on a server connected to the network 120) and on the client device 110. In the embodiment of FIG. 3B, the collision warning system 100 trains 360 a machine learning model, and converts the machine learning model based on a target format of the client device 110. As an example use case, the machine learning model is a Tensorflow model and may be converted into a Deep Learning Container (DLC) format. The collision warning system 100 may use design hints from the Deep Learning Container formatted model to further train the machine learning model. In addition, the collision warning system 100 adds 370 a neural processing engine runtime to an application for execution on the client device 110. In other embodiments, the collision warning system 100 may use another type of software development kit that is not necessarily associated with a neural processing engine.

On the client device 110, the collision warning system 100 loads and runs 380 the formatted model. The client device 110 may include one or more processors, e.g., a central processing unit (CPU), graphics processing unit (GPU), and digital signal processor (DSP). In some embodiments, by running the formatted model on a GPU instead of a CPU of the client device 110, the collision warning system 100 may achieve a greater object detection frame rate, e.g., an improvement from three frames per second to 30 frames per second. The collision warning system 100 may use execution profiling information from running the formatted model on the client device 110 to further train the machine learning model. Example execution profiling information includes performance metrics of the client device 110 such as processing speed, power consumption, or accuracy.

Figure 7:
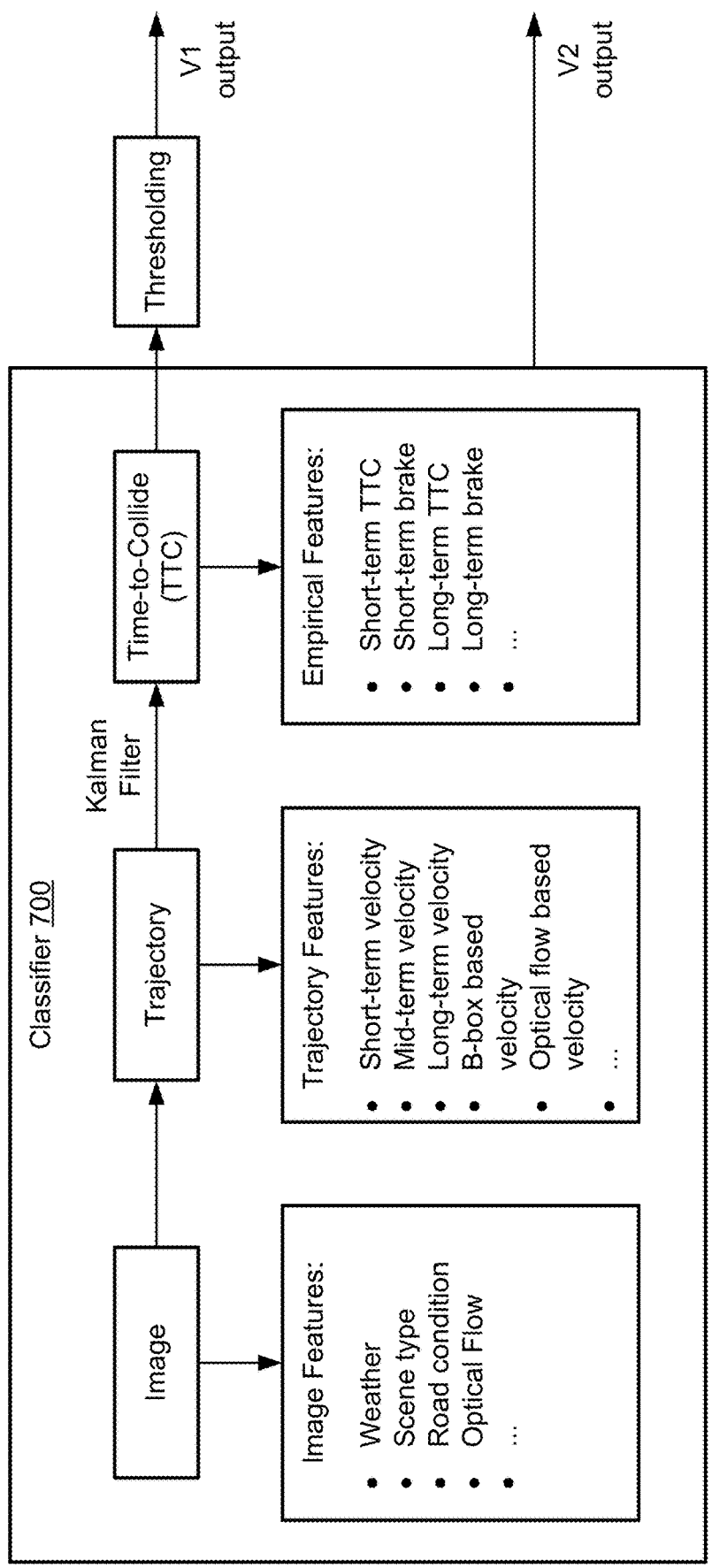
FIG. 7 illustrates features of a classifier of the collision warning system according to an embodiment.

FIG. 7 illustrates features of a classifier 700 of the collision warning system 100 according to an embodiment. The collision warning system 100 may use the classifier 700 to determine when to generate warnings of potential collisions with detected objects. The classifier 700 uses training data to learn to identify a suitable time for notifying a driver to avoid a potential collision. A warning that is provided too early may be over-cautious and unnecessarily disrupt the driver. However, a warning provided too late may be ineffective in preventing the warned collision. The collision warning system 100 trains the classifier 700 using one or more types of features. In the example shown in FIG. 7, the features may include image features, trajectory features, and empirical features, also referred to as time-to-collide (TTC) features. Example image features include weather conditions nearby a vehicle 140, a scene type (e.g., reflecting different brightness levels between morning, afternoon, and night times), road conditions, and optical flow, among others.

Example trajectory features include short-term velocity, mid-term velocity, long-term velocity, bounding box ("B-box") based velocity (e.g., based on rate of change of the bounding box size as an object becomes closer or further), and optical flow based velocity, among others. The collision warning system 100 determines short-term velocity based on a smaller number of image frames relative to the number of image frames used to determine mid-term velocity and long-term velocity. Accordingly, short-term velocity is sensitive to instantaneous features, while mid-term velocity and long-term velocity are stabilized over several image frames (e.g., over a duration of several seconds). Example empirical features include short-term time-to-collide, short-term brake time (e.g., minimum time required to brake the vehicle 140 to stop before collision), long-term time-to-collide, and long-term brake time, among others.

The collision warning system 100 may determine trajectory features based on images features. In addition, the collision warning system 100 may determine empirical features based on images features or trajectory features, which may be filtered, e.g., using a Kalman filter. In an embodiment, the collision warning system 100 compares output of the classifier 700 to a threshold. For instance, responsive to determining that a level of risk of collision output by the classifier 700 is greater than a threshold level, the collision warning system 100 determines to output a warning to a driver. In other embodiments, the classifier 700 determines whether to output the warning without necessary using thresholding.

III. Example Process Flows

Figure 8A:
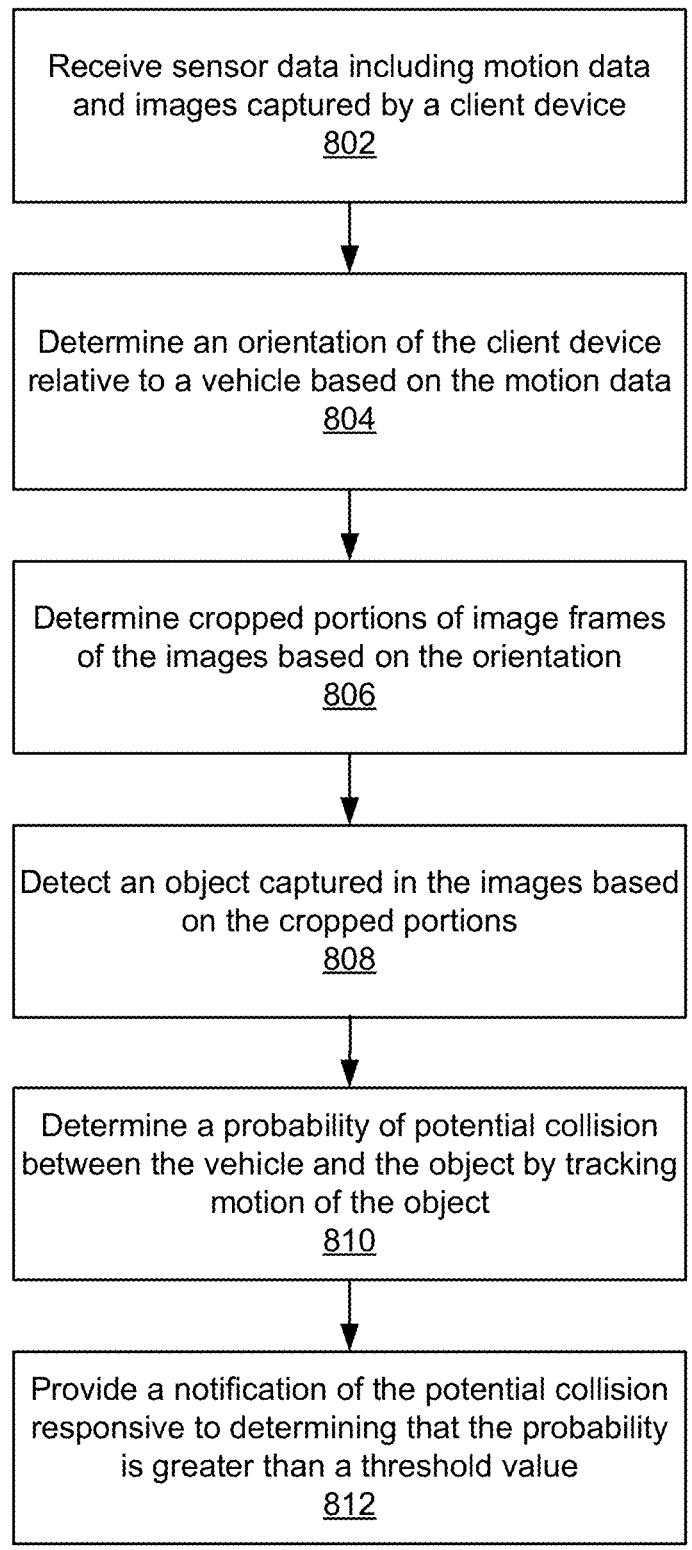
FIG. 8A is a flowchart illustrating a process for determining a probability of a potential collision according to one embodiment.

FIG. 8A is a flowchart illustrating a process 800 for determining a probability of a potential collision according to one embodiment. In some embodiments, the collision warning system 100 uses the process 800 within the system environment in FIG. 1. The process 800 may include different or additional steps than those described in conjunction with FIG. 8A in some embodiments or perform steps in different orders than the order described in conjunction with FIG. 8A. The collision warning system 100 may execute the process 800 using one or more processors on a client device 110.

In one embodiment, the collision warning system 100 receives 802 sensor data associated with a vehicle 140 captured by sensors of a client device 110. The sensor data includes motion data and images of fields of view from the vehicle 140 (e.g., a front-facing dashboard view). The attention-processing engine 300 determines 804 an orientation of the client device 110 relative to the vehicle 140 based on the motion data. The orientation may indicate at least one of pan and tilt angle.

The cropping engine 310 determines 806 cropped portions of image frames of the images based on the orientation of the client device 110. The cropped portions may be determined by selecting a scale from multiple scales each having different size. The object detector 320 detects 808 an object captured in the images based on the cropped portions. The decision engine 350 determines 810 a probability of a potential collision between the vehicle 140 and the object by tracking (by the tracker 330) motion of the object using the images. In addition, the tracker 330 may determine a change in distance between the vehicle and the object using an amount of pixel shift between a first and second (e.g., consecutive) image frames. In an embodiment, the probability of potential collision is determined using a machine learning model trained using features determined using the images, trajectory of the object, and a predicted time-to-collision of the vehicle with the object. Responsive to determining that the probability is greater than a threshold value, the decision engine 350 provides 812 a notification of the potential collision for presentation by the client device 110.

In some embodiments, the collision warning system 100 determines a bounding box including pixels corresponding to the object. Additionally, the collision warning system 100 updates dimensions (or size) of the bounding box based on motion of the object. The collision warning system 100 may also determine a vanishing point based at least in part on the orientation of the client device 110. Responsive to determining that the bounding box overlaps with the vanishing point, the tracker 330 may determine to track the motion of the object. Further, the collision warning system 100 may determine that the object is a different vehicle in the same lane as the vehicle responsive to determining that the bounding box overlaps with the vanishing point.

Figure 8B:
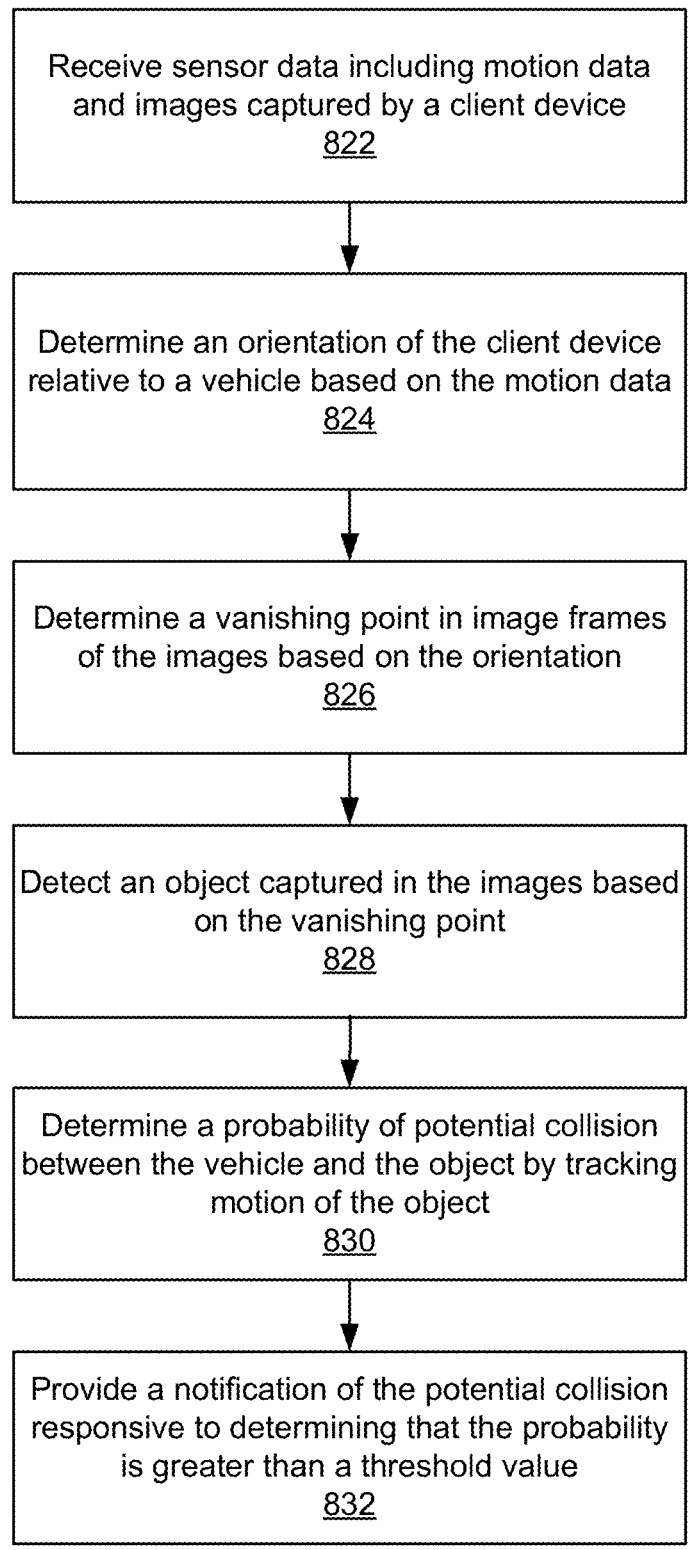
FIG. 8B is another flowchart illustrating a process for determining a probability of a potential collision according to one embodiment.

FIG. 8B is a flowchart illustrating another process 820 for determining a probability of a potential collision according to one embodiment. In some embodiments, the collision warning system 100 uses the process 820 within the system environment in FIG. 1. The process 820 may include different or additional steps than those described in conjunction with FIG. 8B in some embodiments or perform steps in different orders than the order described in conjunction with FIG. 8B. The collision warning system 100 may execute the process 820 using one or more processors on a client device 110.

In one embodiment, the collision warning system 100 receives 822 sensor data associated with a vehicle 140 captured by sensors of a client device 110. The sensor data includes motion data and images of fields of view from the vehicle 140 (e.g., a front-facing dashboard view). The attention-processing engine 300 determines 824 an orientation of the client device 110 relative to the vehicle 140 based on the motion data. The attention-processing engine 300 determines 826 a vanishing point in image frames of the images based on the orientation of the client device 110. The object detector 320 detects 828 an object captured in the images based on the vanishing point. The decision engine 350 determines 830 a probability of a potential collision between the vehicle 140 and the object by tracking (by the tracker 330) motion of the object using the images. Responsive to determining that the probability is greater than a threshold value, the decision engine 350 provides 832 a notification of the potential collision for presentation by the client device 110.

IV. Example Physical Components of a Computer

Figure 9:
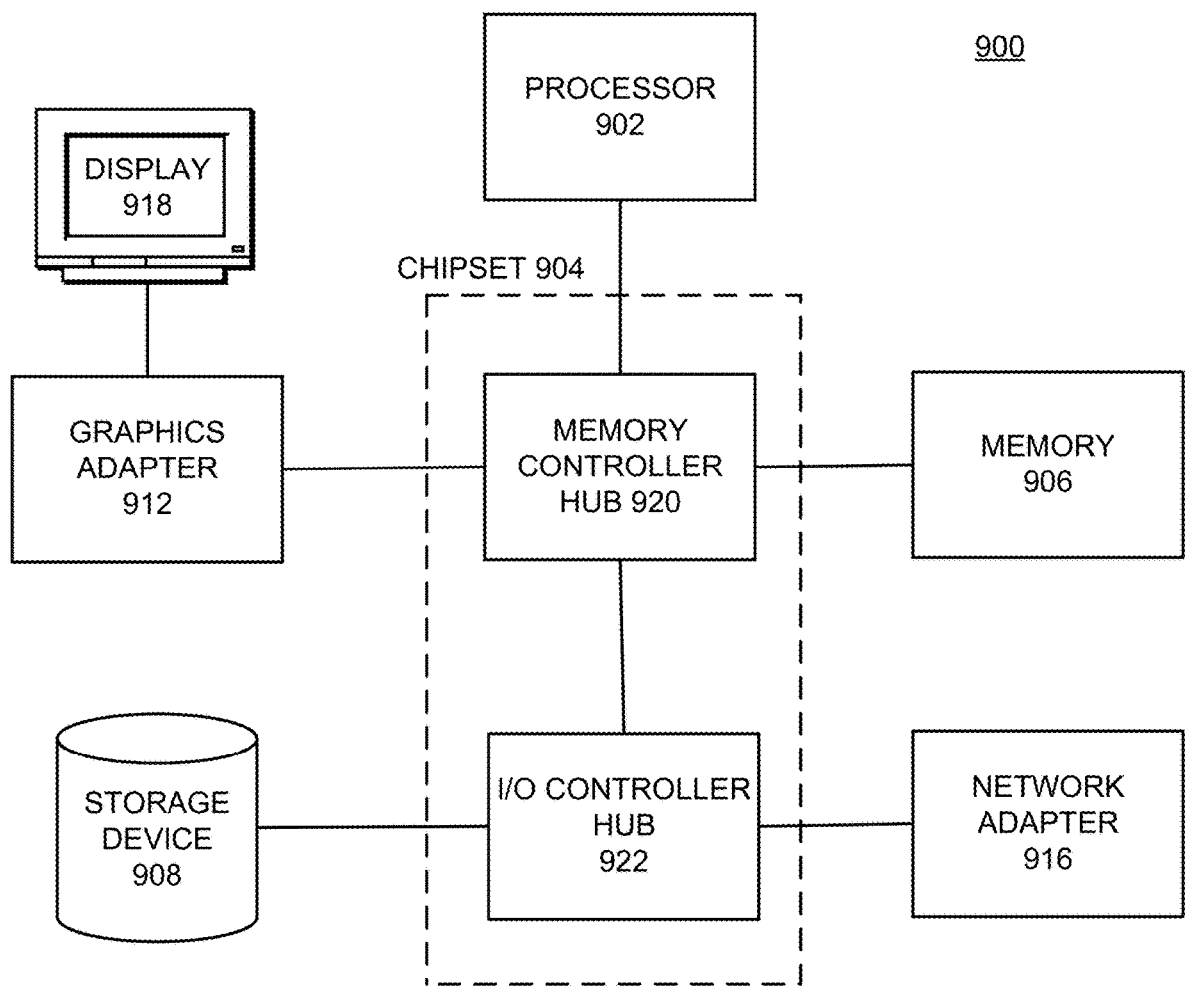
FIG. 9 is a high-level block diagram illustrating physical components of a computer used as part or all of the collision warning system, according to one embodiment.

FIG. 9 is a high-level block diagram illustrating physical components of a computer 900 used as part or all of the components from FIG. 1 (e.g., the collision warning system 100, network system 130, or client devices 110), according to one embodiment. Illustrated are at least one processor 902 coupled to a chipset 904. Also coupled to the chipset 904 are a memory 906, a storage device 908, a graphics adapter 912, and a network adapter 916. A display 918 is coupled to the graphics adapter 912. In one embodiment, the functionality of the chipset 904 is provided by a memory controller hub 920 and an I/O controller hub 922. In another embodiment, the memory 909 is coupled directly to the processor 902 instead of the chipset 904.

The storage device 908 is any non-transitory computer-readable storage medium, such as a hard drive, compact disk read-only memory (CD-ROM), DVD, or a solid-state memory device. The memory 906 holds instructions and data used by the processor 902. The graphics adapter 912 displays images and other information on the display 918. The network adapter 916 couples the computer 900 to a local or wide area network.

As is known in the art, a computer 900 can have different and/or other components than those shown in FIG. 9. In addition, the computer 900 can lack certain illustrated components. In one embodiment, a computer 900 such as a server or smartphone may lack a graphics adapter 912, and/or display 918, as well as a keyboard or pointing device. Moreover, the storage device 908 can be local and/or remote from the computer 900, e.g., embodied within a storage area network (SAN).

As is known in the art, the computer 900 is adapted to execute computer program modules or engines for providing functionality described herein. As used herein, the terms "module" or "engine" refer to computer program logic utilized to provide the specified functionality. Thus, a module and/or engine can be implemented in hardware, firmware, and/or software. In one embodiment, program modules and/or engines are stored on the storage device 908, loaded into the memory 906, and executed by the processor 902.

V. Additional Configurations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product including a computer-readable non-transitory medium containing computer program code, which can be executed by a computer processor for performing any or all of the steps, operations, or processes described.

Embodiments of the invention may also relate to a product that is produced by a computing process described herein. Such a product may include information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for detecting potential collisions, the method comprising:

receiving sensor data associated with a vehicle captured by sensors of a client device, the sensor data including motion data and a plurality of images of fields of view from the vehicle;

determining, using one or more processors of the client device, an orientation of the client device relative to the vehicle based at least in part on the motion data;

determining, using the one or more processors, cropped portions of image frames of the plurality of images based at least in part on the orientation of the client device;

detecting, using the one or more processors, an object captured in the plurality of images based on the cropped portions;

determining a bounding box including pixels corresponding to the object;

updating dimensions of the bounding box based on motion of the object;

determining a vanishing point in the image frames of the plurality of images based at least in part on the orientation of the client device;

responsive to determining that the bounding box overlaps with the vanishing point, determining to track the motion of the object;

determining, using the one or more processors, a probability of a potential collision between the vehicle and the object by tracking the motion of the object using the plurality of images; and responsive to determining that the probability is greater than a threshold value, providing a notification of the potential collision for presentation by the client device.

2. The method of claim 1, wherein the object is a different vehicle, the method further comprising:

responsive to determining that the bounding box overlaps with the vanishing point, determining that the different vehicle is located in a same lane as the vehicle.

3. The method of claim 1, wherein determining the cropped portions of the image frames comprises:

selecting a scale from a plurality of scales each having a different size.

4. The method of claim 1, wherein tracking the motion of the object using the plurality of images comprises:

determining, using optical flow, an amount of pixel shift between a first one of the image frames and a second one of the image frames; and determining a change in distance between the vehicle and the object using the amount of pixel shift.

5. The method of claim 1, wherein the orientation of the client device relative to the vehicle indicates at least a pan angle and a tilt angle.

6. The method of claim 1, wherein the one or more processors includes at least a graphical processing unit executing a machine learning model trained to detect objects in the image frames.

7. The method of claim 1, wherein the probability of a potential collision between the vehicle and the object is determined using a machine learning model trained using features determined using the plurality of images, trajectory of the object, and a predicted time-to-collision of the vehicle with the object.

8. A method for detecting potential collisions, the method comprising:
   receiving sensor data associated with a vehicle captured by sensors of a client device, the sensor data including motion data and a plurality of images of fields of view from the vehicle;
   determining, using one or more processors of the client device, an orientation of the client device relative to the vehicle based at least in part on the motion data;
   determining, using the one or more processors, a vanishing point in image frames of the plurality of images based at least in part on the orientation of the client device;
   detecting, using the one or more processors, an object captured in the plurality of images based on the vanishing point, wherein the object is a different vehicle;
   determining a bounding box including pixels corresponding to the object;
   updating dimensions of the bounding box based on motion of the object;
   responsive to determining that the bounding box overlaps with the vanishing point, determining to track the motion of the object;
   responsive to determining that the bounding box overlaps with the vanishing point, determining that the different vehicle is located in a same lane as the vehicle;
   determining, using the one or more processors, a probability of a potential collision between the vehicle and the object by tracking the motion of the object using the plurality of images; and
   responsive to determining that the probability is greater than a threshold value, providing a notification of the potential collision for presentation by the client device.

9. A non-transitory computer-readable storage medium storing instructions for detecting potential collisions, the instructions when executed by one or more processors of a client device causing the one or more processors to:
   receive sensor data associated with a vehicle captured by sensors of the client device, the sensor data including motion data and a plurality of images of fields of view from the vehicle;
   determine an orientation of the client device relative to the vehicle based at least in part on the motion data;
   determine cropped portions of image frames of the plurality of images based at least in part on the orientation of the client device;
   detect an object captured in the plurality of images based on the cropped portions;
   determine a bounding box including pixels corresponding to the object;
   update dimensions of the bounding box based on motion of the object;
   determine a vanishing point in the image frames of the plurality of images based at least in part on the orientation of the client device;
   responsive to determining that the bounding box overlaps with the vanishing point, determine to track the motion of the object;
   determine a probability of a potential collision between the vehicle and the object by tracking the motion of the object using the plurality of images; and
   responsive to determining that the probability is greater than a threshold value, provide a notification of the potential collision for presentation by the client device.

10. The non-transitory computer-readable storage medium of claim 9, wherein the object is a different vehicle, the instructions when executed by the one or more processors causing the one or more processors to:
    responsive to determining that the bounding box overlaps with the vanishing point, determine that the different vehicle is located in a same lane as the vehicle.

11. The non-transitory computer-readable storage medium of claim 9, wherein determining the cropped portions of the image frames comprises:
    select a scale from a plurality of scales each having a different size.

12. The non-transitory computer-readable storage medium of claim 9, wherein tracking the motion of the object using the plurality of images comprises:
    determine, using optical flow, an amount of pixel shift between a first one of the image frames and a second one of the image frames; and
    determine a change in distance between the vehicle and the object using the amount of pixel shift.

13. The non-transitory computer-readable storage medium of claim 9, wherein the one or more processors includes at least a graphical processing unit executing a machine learning model trained to detect objects in the image frames.

14. The non-transitory computer-readable storage medium of claim 9, wherein the probability of a potential collision between the vehicle and the object is determined using a machine learning model trained using features determined using the plurality of images, trajectory of the object, and a predicted time-to-collision of the vehicle with the object.

* * * * *